(12) United States Patent
Daugela et al.

(10) Patent No.: US 9,400,196 B2
(45) Date of Patent: Jul. 26, 2016

(54) METHOD OF DETECTING AND CONTROLLING E-LINE LOSS IN A CENTRIFUGE

(71) Applicant: SYNCRUDE CANADA LTD. in trust for the owners of the Syncrude Project, as such owners exist now and in the future, Fort McMurray (CA)

(72) Inventors: Darcy Daugela, Edmonton (CA); David Mueller, Edmonton (CA); Daniel Bulbuc, Fort McMurray (CA); Christine Engler-Cooper, Edmonton (CA)

(73) Assignee: SYNCRUDE CANADA LTD., Fort McMurray (CA), in trust for the owners of the Syncrude Project as such owners exist now and in the future ( * ) Notice: Subject to any disclaimer, the term of this patent is extended or adjusted under 35 U.S.C. 154(b) by 158 days.

(21) Appl. No.: 14/537,728

(22) Filed: Nov. 10, 2014

(65) Prior Publication Data

US 2015/0149098 A1    May 28, 2015

Related U.S. Application Data

(60) Provisional application No. 61/903,229, filed on Nov. 12, 2013.

(51) Int. Cl.
*B04B 13/00* (2006.01)
*G01F 1/00* (2006.01)
*B04B 1/08* (2006.01)

(52) U.S. Cl.
CPC ... *G01F 1/00* (2013.01); *B04B 1/08* (2013.01); *B04B 13/00* (2013.01); *B04B 2013/006* (2013.01)

(58) Field of Classification Search
CPC .... B04B 1/08; B04B 13/00; B04B 2013/006; G01F 1/00; G01N 33/28
USPC ......... 494/1–6, 10–11, 23, 25–30, 56, 68–70; 702/45, 50
See application file for complete search history.

(56) References Cited

U.S. PATENT DOCUMENTS

| | | | | |
|---|---|---|---|---|
| 3,189,268 A * | 6/1965 | Nilsson | ............. | B01D 17/0214 210/243 |
| 3,750,940 A * | 8/1973 | Nilsson | .................... | B04B 1/18 494/3 |
| 3,752,389 A * | 8/1973 | Nilsson | .................... | B04B 1/18 494/1 |
| 3,986,663 A * | 10/1976 | Jonsson | .................... | B04B 1/18 494/10 |
| 4,343,431 A * | 8/1982 | Wehling | .................... | B04B 1/14 494/30 |
| 4,525,155 A * | 6/1985 | Nilsson | .................... | B04B 1/10 494/10 |
| 6,976,948 B1 * | 12/2005 | Hamblad | .................. | B04B 1/08 494/10 |

(Continued)

FOREIGN PATENT DOCUMENTS

WO         86/01436       *  3/1986
WO    WO 2010098714 A1 *  9/2010    ............... B04B 1/12

*Primary Examiner* — Charles Cooley
(74) *Attorney, Agent, or Firm* — Bennett Jones LLP (57) ABSTRACT

A method of detecting E-line loss in a disc stack centrifuge is provided, comprising: collecting data from at least one instrument associated with the centrifuge over a specific time period; calculating one or more indicators by comparing the collected data with expected values from a normally operating centrifuge, the indicators being indicative of a start of an E-line loss event; calculating the probability of E-line loss by applying weighted voting to the indicators to yield a probability value; and activating an alert upon determination that the probability value exceeds a threshold value.

10 Claims, 9 Drawing Sheets

(56) References Cited

U.S. PATENT DOCUMENTS

| | | | | |
|---|---|---|---|---|
| 8,192,342 B2* | 6/2012 | Trager | B04B 1/08 494/1 |
| 8,628,458 B2* | 1/2014 | Trager | B04B 1/08 494/25 |
| 8,702,576 B2* | 4/2014 | Karlsson | B04B 1/10 494/1 |
| 2005/0054505 A1* | 3/2005 | Maehans | B04B 1/08 494/6 |
| 2008/0171645 A1* | 7/2008 | Borgstrom | B04B 1/08 494/2 |
| 2009/0298666 A1* | 12/2009 | Trager | B04B 1/08 494/10 |
| 2010/0184579 A1* | 7/2010 | Trager | B04B 1/08 494/56 |
| 2013/0065744 A1* | 3/2013 | Karlsson | B04B 1/10 494/5 |
| 2015/0149098 A1* | 5/2015 | Daugela | G01F 1/00 702/45 |

* cited by examiner

METHOD OF DETECTING AND CONTROLLING E-LINE LOSS IN A CENTRIFUGE

FIELD OF THE INVENTION

The present invention relates generally to a method of detecting an oil-water interface (E-line) in a disc stack centrifuge and controlling E-line loss.

BACKGROUND OF THE INVENTION

Oil sand deposits such as those found in the Athabasca Region of Alberta, Canada, generally comprise water-wet sand grains held together by a matrix of viscous heavy oil or bitumen. Bitumen is a complex and viscous mixture of large or heavy hydrocarbon molecules which contain a significant amount of sulfur, nitrogen and oxygen. Oil sands processing involves extraction and froth treatment to produce diluted bitumen which is further processed to produce synthetic crude oil and other valuable commodities. Extraction is typically conducted by mixing the oil sand in hot water and aerating the resultant slurry to promote the attachment of bitumen to air bubbles, creating a lower-density bitumen froth which floats and can be recovered in a primary separation vessel or "PSV". Such bitumen froth is generally referred to as "primary bitumen froth". Sand grains sink and are concentrated in the bottom of the PSV. They leave the bottom of the vessel as a wet tailings stream containing a small amount of bitumen. Middlings, a watery mixture containing fine solids and bitumen, extend between the froth and sand layers. The wet tailings and middlings are separately withdrawn, may be combined and sent to a secondary flotation process. This secondary flotation process is commonly carried out in a deep cone vessel (a "TOR" vessel) wherein air is sparged into the vessel to assist with flotation. The bitumen recovered by flotation in the TOR vessel is generally referred to as "secondary bitumen froth" and may be recycled to the PSV. The middlings from the deep cone vessel may be further processed in induced air flotation cells to recover contained bitumen.

Froth treatment is the process of reducing water and solids contents from the bitumen froths produced by the PSV, TOR vessel, etc. to produce a clean bitumen product (i.e., "diluted bitumen") for downstream upgrading processes. It has been conventional to dilute this bitumen froth with a light hydrocarbon diluent, for example, with naphtha, to increase the difference in specific gravity between the bitumen and water and to reduce the bitumen viscosity, to thereby aid in the separation of the water and solids from the bitumen. This diluent diluted bitumen froth is commonly referred to as "dilfroth." It is desirable to "clean" dilfroth, as both the water and solids pose fouling and corrosion problems in upgrading refineries. By way of example, the composition of naphtha-diluted bitumen froth typically might have a naphtha/bitumen ratio of 0.65 and contain 20% water and 7% solids. It is desirable to reduce the water and solids content to below about 3% and about 1%, respectively. Separation of the bitumen from water and solids is conducted by adding naphtha to the dilfroth and treating the dilfroth in a sequence of scroll and disc stack centrifuges.

A disc stack centrifuge separates bitumen from water and solids using extremely high centrifugal forces. When the heavy phase (i.e., water and solids) is subjected to such forces, the water and solids are forced outwards against the periphery of the rotating centrifuge bowl, while the light phase (i.e., bitumen) forms concentric inner layers within the bowl. Plates (i.e., the disc stack) provide additional surface settling area, which contributes to speeding up separation.

The oil-water interface or "E-line" is the boundary between the heavy and light phases. The position of the E-line may be varied in order to ensure that the separation takes place with maximum efficiency. However, if the E-line is positioned too far into the disc stack, it will increase wear and product quality will suffer from high solids and water content. Product solids lead to increased wear of downstream equipment, higher maintenance costs, and unplanned outages. If the E-line is positioned too far to the periphery of the centrifuge bowl, there is a risk of losing the E-line. When the E-line is lost, the feed exits through the heavy phase outlet tubes and centrifuge nozzles and results in oil and naphtha being lost to tailings, negatively impacting production and the environment.

There is currently no available technology which accurately measures the E-line position. E-line position must be inferred by measuring process variables. An e-line loss event can be verified by sampling the heavy phase and water streams to detect the presence of hydrocarbons. Instruments such as flow meters are often unreliable, providing poor quality or no data, unreliable readouts, and readings beyond normal range or including extraneous noise.

To avoid E-line loss, the centrifuge is typically run conservatively, with the E-line positioned well into the disc stack. However, this may result in poor product quality, with high water and solids contents in the diluted bitumen product. A computer-generated alarm is currently used to signal E-line loss but is unreliable, failing to detect about 50% of actual E-line loss events and generating over 95% false positives. When the E-line loss is not acted upon immediately, a significant hydrocarbon loss to tailings occurs.

SUMMARY OF THE INVENTION

The current application is directed to a method of detecting E-line loss in a disc stack centrifuge.

Conventional alarm systems to detect E-line loss are unreliable, failing to detect about 50% of actual E-line loss events and generating over 95% false positives. When the E-line loss is not recovered immediately, a significant hydrocarbon loss to tailings occurs.

However, it was discovered that data representing multiple operating parameters of the centrifuge can be used to calculate specific indicators which are indicative of the start of an E-line loss event. In particular, the indicators may include: a decrease in product flow, an increase in heavy phase flow, heavy phase flow exceeding product flow, an increase in heavy phase pressure, heavy phase pressure exceeding export set-point, an increase in power consumption by the centrifuge, and a decrease in the speed of the centrifuge.

The data are filtered to exclude any poor data points or outliers, thereby minimizing instrument errors, poor or missing data, and false positives. Weighted voting is applied to the indicators to determine the probability of an E-line loss, and alert of the occurrence of the E-line loss upon comparison to a threshold value.

Compared to the detection rate and number of false positives for conventional alarm systems, the invention may increase the E-line loss detection rate to over 90% and decrease the number of false positives to less than 10%.

Improvement in the detection of E-line loss minimizes delay in taking recovery action to restore proper E-line position within the centrifuge, thereby ensuring product quality and low hydrocarbon loss.

Thus, broadly stated, in one aspect of the invention, a method of detecting E-line loss in a disc stack centrifuge is provided, comprising:

collecting data from at least one instrument associated with the centrifuge over a specific time period;

calculating one or more indicators by comparing the collected data with expected values from a normally operating centrifuge, the indicators being indicative of a start of an E-line loss event;

calculating the probability of E-line loss by applying weighted voting to the indicators to yield a probability value; and activating an alert upon determination that the probability value exceeds a threshold value.

DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF THE PREFERRED EMBODIMENT

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
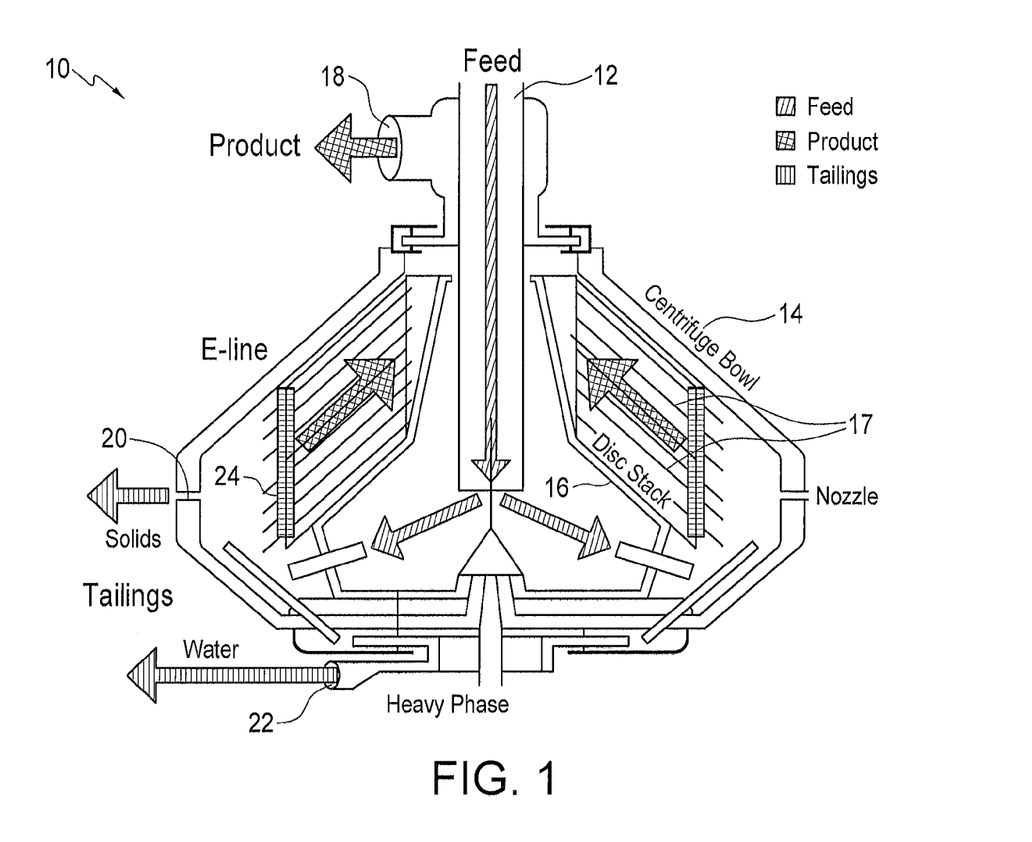
FIG. 1 is a cutaway sectional view showing a disc stack centrifuge for separation of the heavy phase (water and solids) and light phase (bitumen) within dilfroth.

The present invention relates generally to a method of detecting E-line loss in a disc stack centrifuge. A disc stack centrifuge 10 is generally shown in FIG. 1 to include a stationary inlet pipe 12 though which the feed enters the centrifuge 10; a bowl 14 which rotates to generate centrifugal forces which separate the heavy and light phases of the feed; a disc stack 16 comprising a plurality of stacked separation discs 17 which ensures that flow is evenly spread among the discs 17 and facilitates separation of the heavy and light phases; a product outlet 18 at the top of the centrifuge 10 to allow the dilbit product to exit; solids discharge nozzles 20 through which the solids and some water exit the centrifuge 10; and a liquids discharge outlet 22 through which the water and remaining solids exits the centrifuge 10. When the bowl 14 rotates, the centrifugal forces push the solids and water outwards against the periphery of the bowl 14 to exit through the solids discharge nozzles 20 and liquids discharge outlet 22. The bitumen product forms concentric inner layers within the bowl 14 to exit from the product outlet 18.

As used herein, the term "E-line" 24 refers to the oil-water interface or boundary between the heavy and light phases. As used herein, the term "E-line loss event" refers to a time period during which no oil-water interface is maintained within the centrifuge, i.e., the E-line is lost. Detecting E-line loss plays an important role in ensuring product quality; minimizing hydrocarbon loss to tailings; decreasing wear of the disc stack centrifuge and downstream equipment; and avoiding high maintenance costs and unplanned outages. Detection of E-line loss is critical for activating immediate recovery.

Figure 2:
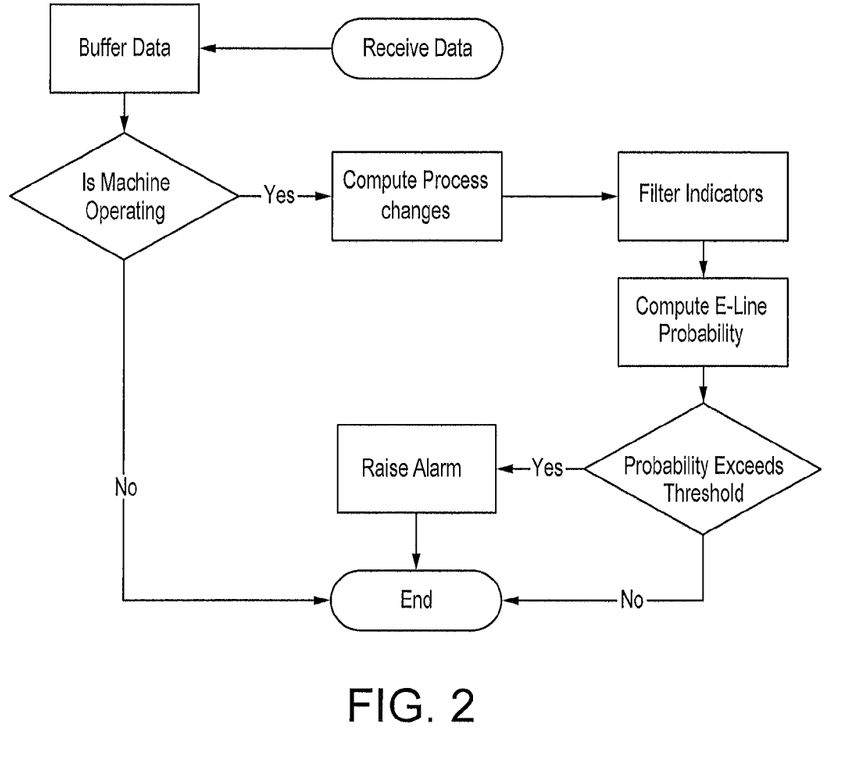
FIG. 2 is a flowchart illustrating one embodiment of the present invention for detecting E-line loss.

The process of the present invention for detecting an E-line loss is illustrated in FIG. 2 as a flowchart showing decisions (for example, Yes/No) as diamonds, and processing steps or activities as rectangular boxes.

The centrifuge is equipped with one or more instruments which monitor and control its operation, As used herein, the term "instrument" refers to a device capable of detecting and/or measuring one or more parameters during operation of the disc stack centrifuge, generating data representative of the parameters, and transmitting the data to a host computer. The term is meant to include flow meters, pressure sensors, control panels, alarms, and the like.

As used herein, the term "parameter" includes, but is not limited to, product flow, heavy phase flow, heavy phase pressure, power consumption of the centrifuge, speed of the centrifuge, vibration, and the status of the feed valve (i.e., open or closed). At least one instrument is mounted in, on, or around the centrifuge. The instrument can be placed close enough to the centrifuge being monitored to perform the E-line loss detection function, such as within any suitable distance sufficient to detect a measurable parameter.

In one embodiment, a flow meter is positioned at the product outlet 18 to measure the product flow. In one embodiment, a flow meter is positioned at the heavy phase outlet 20 to measure the heavy phase flow. A sensor may also be placed at the heavy phase outlet 20 to detect the pressure of the heavy phase flow. A number of useful flow meters and pressures sensors are well known in the art and within the knowledge of a person skilled in the art.

In one embodiment, the centrifuge is equipped with sensors to monitor the speed (revolutions per minute or "RPM") of the bowl, the power consumption (kW×m$^3$/hr), vibration (Hz), and the status of the feed valve (open or closed). Such sensors are well known in the art.

Each instrument is operatively connected to a host computer remote from the centrifuge. As used herein, the term "operatively connected" means, in the case of hardware, an electrical connection, for example, wire or cable, for conveying electrical signals, or in the case of firmware or software, a communication link between the processor (which executes the firmware—i.e., operating under stored program control—or software) and another device for transmitting/receiving messages or commands.

The computer may comprise any desktop computer, laptop computer, a handheld or tablet computer, or a personal digital assistant, and is programmed with appropriate software, firmware, a microcontroller, a microprocessor or a plurality of microprocessors, a digital signal processor or other hardware or combination of hardware and software known to those skilled in the art. The computer may be located within a company, possibly connected to a local area network, and connected to the Internet or to another wide area network, or connected to the Internet or other network through a large application service provider. The application software may comprise a program running on the computer, a web service, a web plug-in, or any software running on a specialized device, to enable the data to be processed and analyzed.

The instruments generate data representative of the selected parameters, and transmit the data to the computer. The data generated from the instruments are acquired in real time and immediately transmitted to the computer. It is nevertheless possible for a time offset to remain between the moment the parameter occurred and the moment at which the data are transmitted to the computer. In one embodiment, the data may be sampled at a rate ranging from about 2 seconds to about 1 minute. In one embodiment, the data are sampled at a rate of about 5 seconds.

Detection of an E-line loss situation is calculated from the data. Process changes are calculated by comparing the data acquired from the centrifuge to expected values for process variables from a normally operating centrifuge in which the E-line is optimally positioned. Particular indicators are thus extracted from the data and are indicative of the start of an E-line loss event. In one embodiment, the indicators comprise a decrease in product flow; an increase in heavy phase flow; heavy phase flow exceeding product flow; an increase in heavy phase pressure; heavy phase pressure exceeding export set-point; an increase in power consumption by the centrifuge; and a decrease in the speed of the centrifuge.

Among these indicators, the decrease in product flow and increase in heavy phase flow are particularly informative of an E-line loss event. Under normal operations, the product flow rate is typically greater than about 10 L/s and the heavy phase flow is less than about 3 L/s. During an E-line loss event, the product exits the heavy phase outlet, resulting in a decrease in the product flow rate and an increase in the heavy phase flow, with the heavy phase flow rate often exceeding the product flow rate. The increase in heavy phase pressure coincides with the increase in heavy phase flow. The increase in power consumption and a decrease in the speed of the centrifuge occur due to the increased energy required to accelerate the increased heavy phase flow.

The data are filtered to exclude any poor data points or outliers, thereby minimizing instrument errors, poor or missing data, and false positives.

The probability of an E-line loss event is then calculated using weighted voting which is a scoring method to evaluate a set of data. Specific votes are allocated in accordance with the value of each indicator. As an example, if the change in product flow in a given time period is less than 5 L/s, the vote is +2. If the change in product flow in the same time period is less than 3 L/s, the vote is +1. Possible votes are allocated to values of corresponding process variables which would be expected from a normally operating centrifuge wherein the E-line is optimally positioned. As an example, a possible vote representing a "good" or normal product flow value of greater than about 10 L/s is scored as +2. The sum of the votes for all the indicators is calculated. The sum of the possible votes for all the normal values is calculated.

The probability of an E-line loss event is then calculated by the formula:

$$\text{Probability} = \text{votes}/\text{possible votes} \tag{1}$$

A threshold value is set to indicate the limit above which the alarm will be activated. If the calculated probability value does not exceed the threshold value, there is no E-line loss and the alarm is not activated. If the calculated probability value exceeds the threshold value, an E-line loss has occurred. In one embodiment, at least two consecutive probability values greater than the threshold value are indicative of an E-line loss.

An alarm is subsequently activated to alert the operator to take recovery action to restore the E-line position in the disc stack centrifuge. The operator may be alerted for example, through a message on the computer or via Internet, email, text message, and the like.

Recovery involves closing the feed valve and flooding the centrifuge with water. The feed is reintroduced and flood water is closed. The E-line is then able to re-establish itself. This is often accompanied by an increase in the heavy phase back pressure to push the E-line further into the centre of the centrifuge.

The present invention thus conveniently enables an operator to detect an E-line loss in the disc stack centrifuge and to restore the E-line position quickly without having to inspect the centrifuge in person. The frequency of false positive alarms is also reduced. Data representing multiple operating parameters may be collected easily and rapidly from the centrifuge for compilation, analysis, and processing using a single computer to indicate whether or not an E-line loss has occurred. When the E-line loss is not acted upon immediately, a significant hydrocarbon loss to tailings occurs. Improvement in the detection of E-line loss thus ensures a balance between good product quality and low hydrocarbon loss.

EXAMPLE 1

Twenty-eight disc stack centrifuges (Alfa Laval, model no. SX-320) were equipped with flow meters and sensors to detect and/or measure sixteen process variables. Application software (PI System, OSIsoft Canada ULC) was used to acquire the real-time data at a 1 minute scan rate for each centrifuge. A real-time data collection, archiving, and distribution engine (PI Server, OSIsoft Canada ULC) was used as a central repository for the data. A data transfer process was created to extract data from the repository, transform the data, and store the data in a database management system (SQL Server, Microsoft) for analysis and processing. Data were collected for two years to accumulate over 26 million rows of time series data.

The following indicators were selected as indicative of the start of an E-line loss event:
a decrease in product flow;
an increase in heavy phase flow;
heavy phase flow exceeding product flow;
an increase in heavy phase pressure;
heavy phase pressure exceeding export set-point;
an increase in power consumption by the centrifuge; and
a decrease in the speed of the centrifuge.

A weighted voting system was encoded into application software which processed the data and labeled the start of suspected E-line loss events, and times where the feed valve was closed for less than 20 minutes, indicating that action might have been taken to recover from an E-Line loss event. These suspected events were stored in the local database. Each of the suspected E-line loss events was visually analyzed using a custom visualization tool which marked the event as either probable or false. If the suspected event was confirmed as a probable E-line loss, both the start and end time for the event was recorded in the database. Through labeling, confirmation, and analysis, the weighted voting system was refined to improve the accuracy of detecting an E-line loss event. Each indicator was tuned with respect to the threshold values for change and the time period to measure the change.

Figure 3:
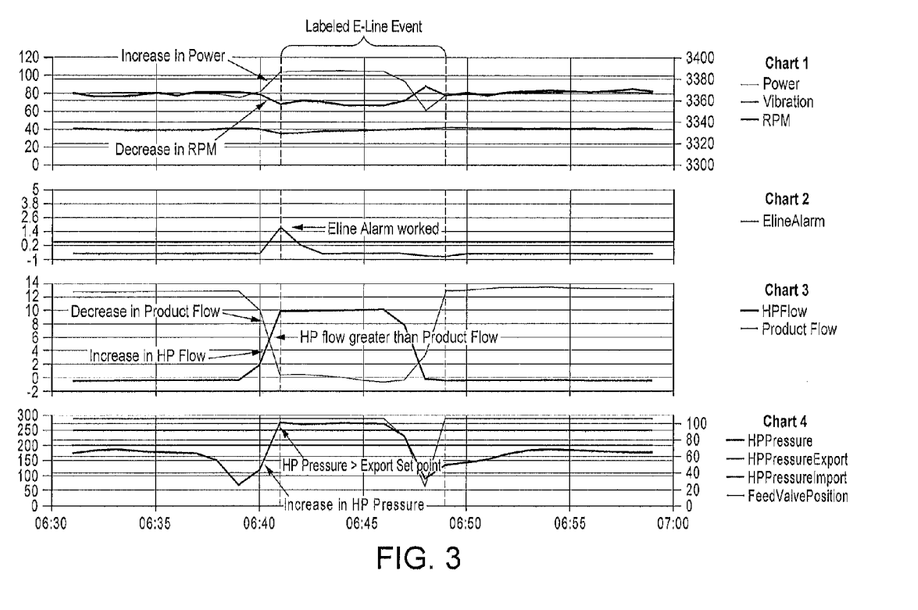
FIG. 3 is a diagram showing an E-line loss event with the selected indicators labeled.

Five hundred and thirty E-line loss events were identified from the 28 centrifuges. FIGS. 3-6 show several detected E-line loss events. FIG. 3 shows an E-line loss event with the indicators labeled. All of the instrumentation operated properly, including the E-line loss alarm which was activated since the calculated probability of E-line loss event value exceeded the alarm threshold value (chart 2).

Figure 4:
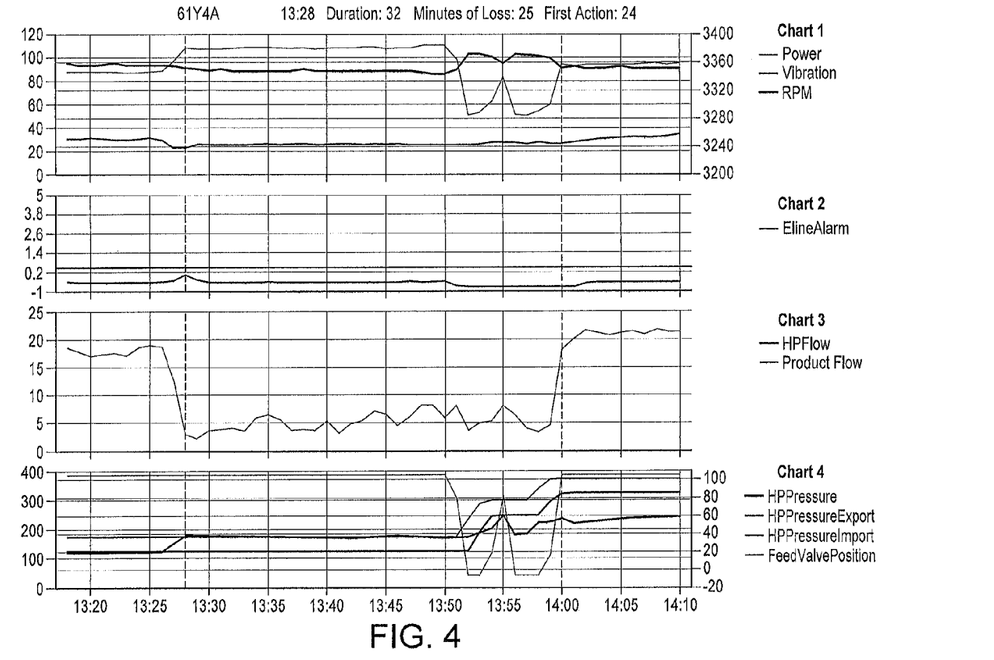
FIG. 4 is a diagram showing an E-line loss event.
Figure 5:
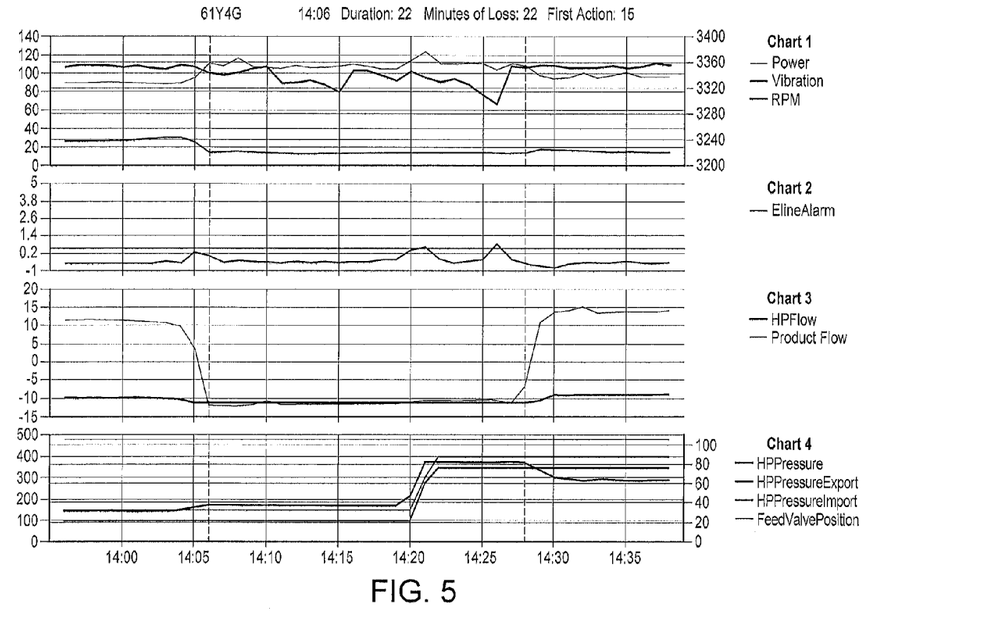
FIG. 5 is a diagram showing an E-line loss event.
Figure 6:
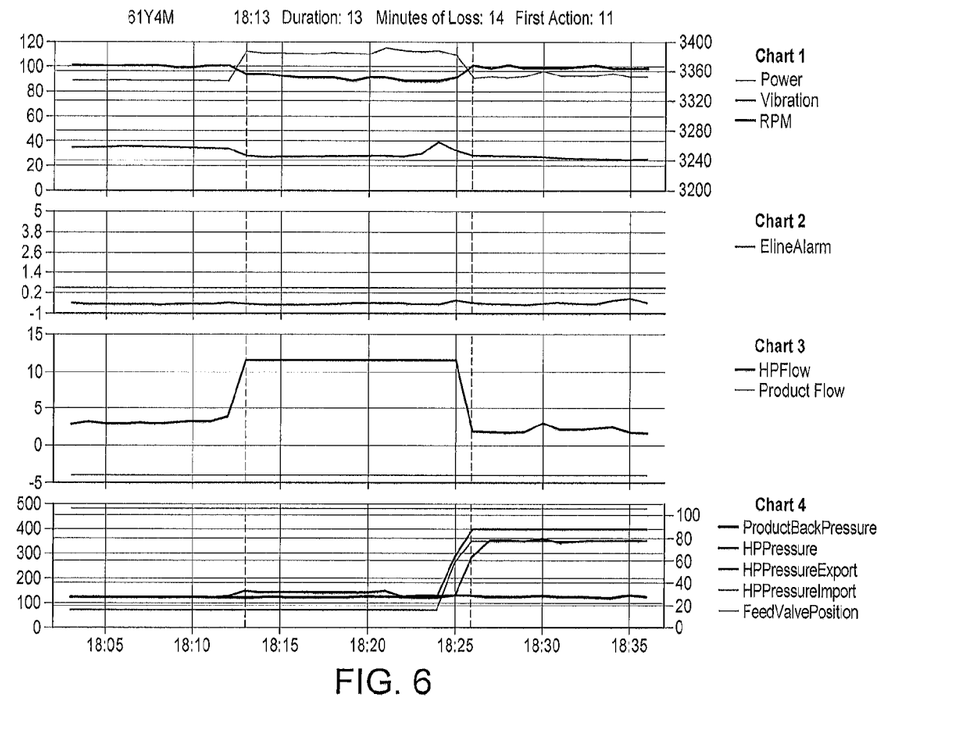
FIG. 6 is a diagram showing an E-line loss event.

FIG. 4 shows an E-line loss event where the heavy phase flow meter and E-line loss alarms were not working. FIG. 5 shows an E-line loss event where the heavy phase flow meter was not responsive, and the E-line loss alarm did not work. FIG. 6 shows an E-line loss event where the E-line loss alarm did not work. The product flow meter was not working at this time and reported an incorrect flow of less than 4 L/s.

Figure 7:
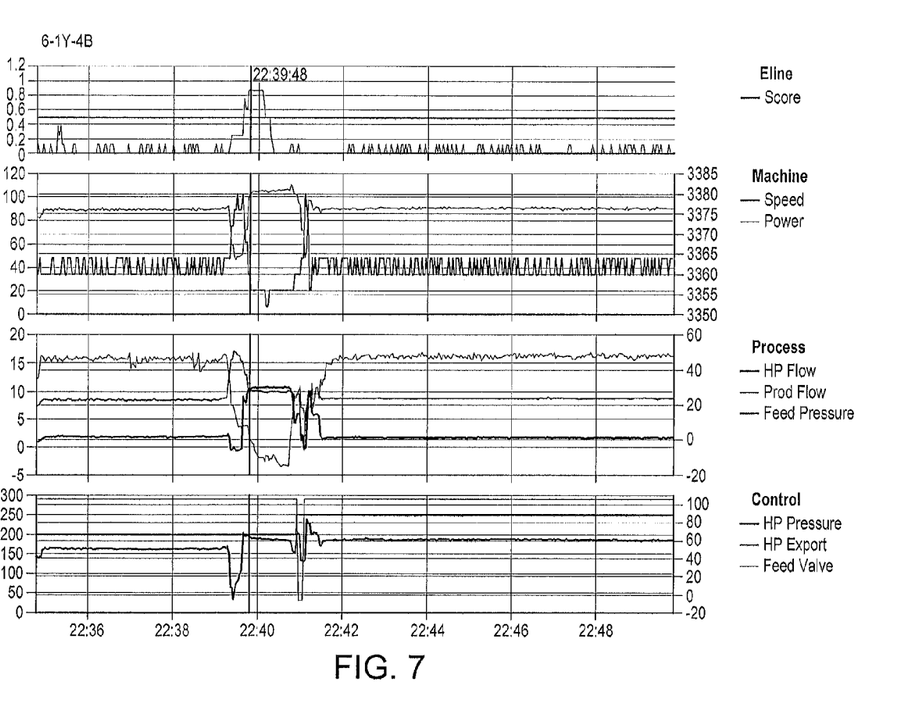
FIG. 7 is a diagram showing an E-line loss event with pre-condition.

An unexpected outcome of analysis on the 2 second data was the identification of a possible pre-condition to about 20% of the E-line loss events (FIG. 7). There was a spike in feed pressure and an initial decrease in heavy phase flow and pressure before the increased heavy phase flow characteristic of an E-line loss event. An initial increase in speed and decrease in power were observed before the characteristic E-line loss response of decreased speed and increased power.

Figure 8:
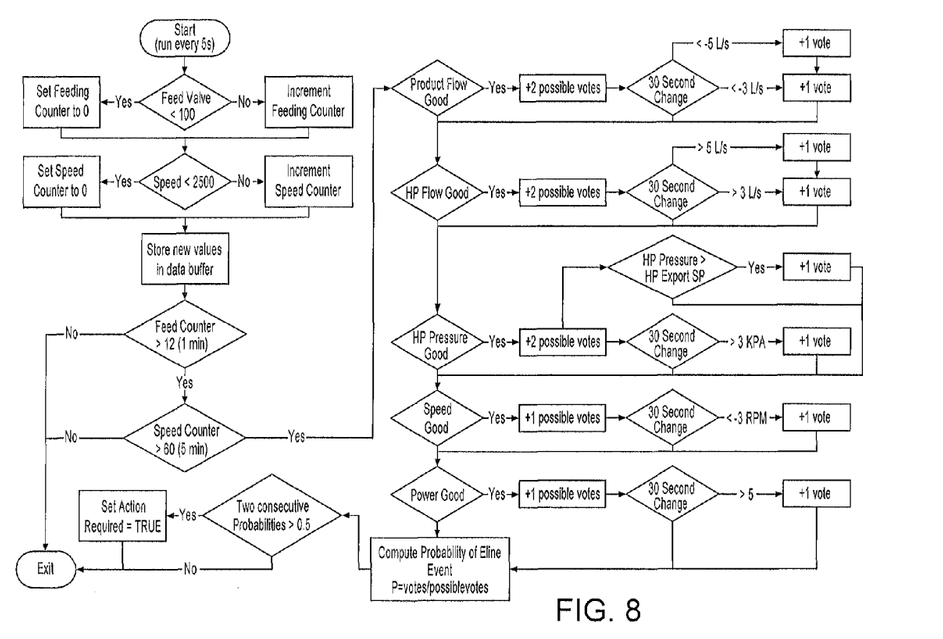
FIG. 8 is a flowchart illustrating one embodiment of the present invention for detecting E-line loss.

The process for detecting an E-line loss is illustrated in FIG. 8 as a flowchart showing decisions (for example, Yes/No) as diamonds, and processing steps or activities (for example, increment counter, addition of votes) as rectangular boxes.

The process is run at a set interval ("Start"). While initial analysis was conducted using data acquired at a 1 minute scan rate, increasing the scanning rate was considered necessary due to the low resident time (seconds rather than minutes) of materials in the centrifuge. The scan rate was changed to 2 seconds in 14 centrifuges, and data were collected over three months to obtain about 300 million data points. The percentages of E-line loss events detected and false positives for different run intervals (2 seconds, 6 seconds, 10 seconds) were compared to those for a standard E-line loss alarm system ("current alarm") (Table 1). The results indicate that there is a trade-off between E-line loss events detected and the false positive rate. A run interval of 5 seconds was selected as the balance between the detection rate and false positive rate.

TABLE 1

| Run Interval | E-Line Loss Events Detected | False Positives |
|---|---|---|
| 2 Seconds | 98% | 38% |
| 6 Seconds | 95% | 21% |
| 10 Seconds | 88% | 16% |
| Current Alarm | 54% | 96% |

If the feed valve value is less than 100, the feed counter is set to 0. If not, the feed valve counter is incremented to 1. If the speed of the centrifuge is less than 2,500 RPM, the speed counter is set to 0. If not, the speed counter is incremented to 1. These values of the feed valve and speed are stored in a data buffer. As used herein, the term "data buffer" refers to a region of a physical memory storage used to temporarily store data while they are being moved from one place to another.

If the feed valve has not been open for 1 minute (12 readings at 5 seconds), the centrifuge has not been at speed for 5 minutes (60 readings at 5 seconds), or the centrifuge is off or not in production mode, then the probability and alarm are reset to 0. "Exit" signals the end of the process.

However, if the feed valve has been open for 1 minute (12 readings at 5 seconds) and the centrifuge has been at speed for 5 minutes (60 readings at 5 seconds), then a weighted voting system is initiated to detect an E-line loss event based on the product flow, heavy phase flow, heavy phase pressure, heavy phase pressure exceeding export set-point, speed of the centrifuge, and power consumption of the centrifuge.

Votes and possible votes are set at 0. The votes are calculated as follows:
1) If the change in product flow in 30 seconds is less than 5 L/s, the vote is +1. If the change in product flow in 30 second is less than 3 L/s, the vote is +1.
2) If the change in heavy phase flow in 30 seconds is greater than 5 L/s, the vote is +1. If the change in heavy phase flow in 30 seconds is less than 3 L/s, the vote is +1.
3) If the heavy phase pressure exceeds the export set-point, the vote is +1. If the change in heavy phase pressure in 30 seconds is less than 3 KPa, the vote is +1.
4) If the change in the speed of the centrifuge in 30 seconds is less than 3 RPM, the vote is +1.
5) If the change in power consumption of the centrifuge in 30 seconds is greater than 5, the vote is +1.

The possible votes are calculated as follows:
1) If the product flow value is good, the possible vote is +2.
2) If the heavy phase flow value is good, the possible vote is +2.
3) If the heavy phase pressure value is good, the possible vote is +1.
4) If the heavy phase pressure value and heavy phase set point value are good, the possible vote is +1.
5) If the speed value is good, the possible vote is +1.
6) If the power consumption value is good, the possible vote is +1.

The sum of the votes for all the indicators is calculated. The sum of the possible votes for all the normal values is calculated.

The probability of an E-line loss event is calculated by the formula:

$$\text{Probability} = \text{votes/possible votes} \tag{1}$$

A threshold value is set to indicate the limit above which the alarm will be activated (for example, an alarm limit greater than 0.5). If two consecutive probability values are greater than the threshold value, the "action required" is set to "on." Otherwise, the "action required" is set to "off." As used herein, the term "action required" refers to initiating recovery to re-establish the proper E-line position within the centrifuge.

Figure 9:
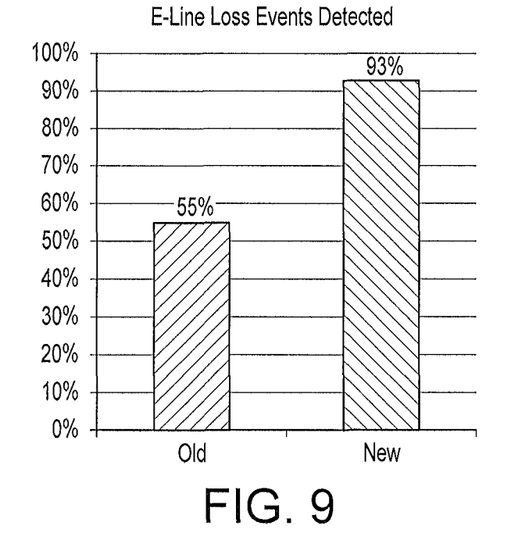
FIG. 9 is a graph showing the percentages of E-line loss events detected using the process of the present invention ("New") and a standard E-line loss alarm system ("Old").
Figure 10:
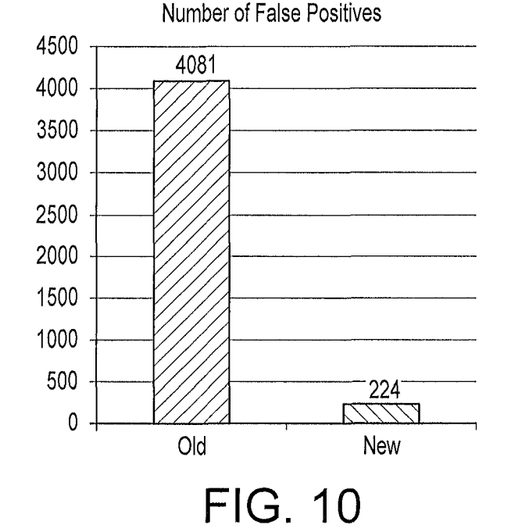
FIG. 10 is a graph showing the number of false positives using the process of the present invention ("New") and a standard E-line loss alarm system ("Old").

The above process was found to exhibit superior detection performance compared to that of a standard E-line loss alarm system. Over a five month period, the process increased the E-line loss detection rate from 55% to 93% (FIG. 9), and decreased the number of false positive alarms from 4081 to 224 (FIG. 10).

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A method of detecting E-line loss in a disc stack centrifuge comprising:
   collecting data from at least one instrument associated with the centrifuge over a specific time period;
   calculating one or more indicators by comparing the collected data with expected values from a normally operating centrifuge, the indicators being indicative of a start of an E-line loss event;
   calculating the probability of E-line loss by applying weighted voting to the indicators to yield a probability value; and
   activating an alert upon determination that the probability value exceeds a threshold value.

2. The method of claim 1, further comprising filtering the collected data to eliminate outliers.

3. The method of claim 2, wherein at least two consecutive probability values greater than the threshold value are indicative of an E-line loss.

4. The method of claim 3, wherein the instrument is capable of detecting or measuring one or more parameters during centrifuge operation, generating data representative of the parameters, and transmitting the data to a host computer operatively connected to the instrument and programmed to process and analyze the data.

5. The method of claim 4, wherein the instrument is selected from a flow meter or a sensor.

6. The method of claim 4, wherein the parameter is selected from product flow, heavy phase flow, heavy phase pressure, power consumption of the centrifuge, speed of the centrifuge, vibration, or status of a feed valve.

7. The method of claim 6, wherein the one or more indicators comprise a decrease in product flow; an increase in heavy phase flow; heavy phase flow exceeding product flow; an increase in heavy phase pressure; heavy phase pressure exceeding export set-point; an increase in power consumption by the centrifuge; and a decrease in the speed of the centrifuge.

8. The method of claim 1, wherein the specific time period extends from an initial baseline time point to a subsequent time point.

9. The method of claim 8, wherein the data are collected at an interval ranging from about 2 seconds to about 1 minute during the specific time period.

10. The method of claim 9, wherein the data are collected at an interval of about 5 seconds during the specific time period.

* * * * *